United States Patent
Smith et al.

(10) Patent No.: US 11,002,556 B2
(45) Date of Patent: May 11, 2021

(54) SYSTEM AND METHOD FOR ARRANGING TRANSPORTATION SYSTEMS FOR TRAVEL

(71) Applicant: General Electric Company, Schenectady, NY (US)

(72) Inventors: Michael Patrick Smith, Chicago, IL (US); Eren Con, Chicago, IL (US)

(73) Assignee: TRANSPORTATION IP HOLDINGS, LLC, Norwalk, CT (US)

(*) Notice: Subject to any disclaimer, the term of this patent is extended or adjusted under 35 U.S.C. 154(b) by 449 days.

(21) Appl. No.: 15/923,461

(22) Filed: Mar. 16, 2018

(65) Prior Publication Data

US 2018/0283888 A1    Oct. 4, 2018

Related U.S. Application Data

(60) Provisional application No. 62/478,368, filed on Mar. 29, 2017.

(51) Int. Cl.
| | |
|---|---|
| *G01C 21/34* | (2006.01) |
| *G05D 1/02* | (2020.01) |
| *G08G 1/00* | (2006.01) |

(52) U.S. Cl.
CPC ....... *G01C 21/3469* (2013.01); *G05D 1/0223* (2013.01); *G05D 1/0291* (2013.01); *G08G 1/22* (2013.01); *G05D 2201/0213* (2013.01)

(58) Field of Classification Search
CPC ............. G01C 21/3469; G05D 1/0223; G05D 1/0291; G05D 2201/0213; G08G 1/22
See application file for complete search history.

(56) References Cited

U.S. PATENT DOCUMENTS

| | | | |
|---|---|---|---|
| 5,680,122 A | 10/1997 | Mio et al. | |
| 5,913,917 A * | 6/1999 | Murphy | B60R 16/0232 701/123 |
| 6,032,097 A | 2/2000 | Iihoshi et al. | |
| 6,128,559 A | 10/2000 | Saitou et al. | |

(Continued)

OTHER PUBLICATIONS

Baker, "The Simulation of Unsteady Aerodynamic Cross Wind Forces on Trains." Journal of Wind Engineering and Industrial Aerodynamics, vol. 98 No. 2, 2010, pp. 88-99 Publisher, Country (12 pages).

(Continued)

*Primary Examiner* — Calvin Cheung
(74) *Attorney, Agent, or Firm* — Christopher R. Carroll; The Small Patent Law Group LLC

(57) ABSTRACT

A system determines wind information for achieving a desired outcome for travel of a selected group of one or more vehicles along one or more routes. The system determines wind drag and/or a parasitic energy loss for travel by different potential groups of vehicles based on the wind information. The system determines the wind drag and/or parasitic energy loss for each of plural, different locations along the one or more routes, visually presents the wind drag and/or parasitic energy loss for each of the different groups of vehicles, and/or determines the selected group of the one or more vehicles from the different groups of vehicles for travel along the one or more routes to achieve the desired outcome based on the wind drag and/or parasitic energy loss that is determined.

23 Claims, 5 Drawing Sheets

(56) References Cited

U.S. PATENT DOCUMENTS

| | | | |
|---|---|---|---|
| 6,813,561 | B2 | 11/2004 | MacNeille et al. |
| 8,352,111 | B2 | 1/2013 | Mudalige |
| 8,706,409 | B2* | 4/2014 | Mason ............... G01C 21/3469 701/424 |
| 9,002,547 | B2 | 4/2015 | Matthews et al. |
| 9,182,764 | B1* | 11/2015 | Kolhouse ............. G05D 1/0217 |
| 9,261,374 | B2 | 2/2016 | Mundinger et al. |
| 9,441,980 | B2 | 9/2016 | Corne et al. |
| 9,605,606 | B2 | 3/2017 | Dufford et al. |
| 9,701,302 | B2 | 7/2017 | Matsunaga et al. |
| 9,766,153 | B2* | 9/2017 | Magee ............. G01M 17/0076 |
| 10,570,819 | B1* | 2/2020 | Bear .................. G01M 17/007 |
| 2003/0089167 | A1* | 5/2003 | Markstaller ............. G01M 9/04 73/147 |
| 2006/0237237 | A1* | 10/2006 | Kerschbaum ..... G01M 17/0072 177/145 |
| 2007/0219682 | A1 | 9/2007 | Kumar et al. |
| 2008/0033605 | A1 | 2/2008 | Daum et al. |
| 2008/0249667 | A1 | 10/2008 | Horvitz et al. |
| 2010/0023190 | A1 | 1/2010 | Kumar et al. |
| 2010/0262321 | A1 | 10/2010 | Daum et al. |
| 2011/0040480 | A1 | 2/2011 | Tebbutt |
| 2012/0221257 | A1* | 8/2012 | Froncioni ................ G06F 7/00 702/45 |
| 2012/0239268 | A1* | 9/2012 | Chen .................... B60W 30/17 701/96 |
| 2013/0013195 | A1 | 1/2013 | Kritt et al. |
| 2013/0013451 | A1 | 1/2013 | Kritt et al. |
| 2013/0099525 | A1* | 4/2013 | Keyes .................... B62D 35/00 296/180.5 |
| 2013/0261914 | A1* | 10/2013 | Ingram ................ B60W 20/12 701/70 |
| 2014/0052373 | A1 | 2/2014 | Hoch et al. |
| 2014/0350767 | A1 | 11/2014 | Fries |
| 2015/0019132 | A1* | 1/2015 | Gusikhin ........... G01C 21/3469 701/537 |
| 2015/0020586 | A1* | 1/2015 | Kerestan .................. G01B 5/14 73/147 |
| 2017/0011633 | A1 | 1/2017 | Boegel |
| 2017/0030728 | A1* | 2/2017 | Baglino ............. G01C 21/3469 |
| 2018/0079405 | A1* | 3/2018 | Gaither .............. B60G 17/0161 |
| 2018/0170396 | A1* | 6/2018 | Burnette ............. B60W 10/184 |
| 2018/0341729 | A1* | 11/2018 | Kowalyshyn .......... G06Q 50/06 |

OTHER PUBLICATIONS

Douglas et al., "An Assessment of Available Measures to Reduce Traction Energy Use in Railway Networks." Energy Conversion and Management, 2015, pp. 1149-1165, 106, Publisher, Country (17 pages).

Östh, et al., "A Study of the Aerodynamics of a Generic Container Freight Wagon Using Large-Eddy Simulation." Journal of Fluids and Structures, 2014, vol. 44, pp. 31-51, Publisher, Country (21 pages).

Alam et al, "Effects of Crosswinds on Double Stacked Container Wagons", 16th Australasian Fluid Mechanics Conference, Australia, Dec. 2-7, 2007, (4 pages).

Barkan, "Railroad Transportation Energy Efficiency", Illinois Railroad Engineering Program, 2007, Yuhas (61 pages).

Beagles et al., "The Aerodynamics of Freight: Approaches to Save Fuel by Optimising the Utilisation of Container Trains", Proceedings of the Institution of Mechanical Engineers, Part F: Journal of Rail and Rapid Transit 2017 (38 pages).

Burmeister, "GIS Wind Force Analytics", Dipl.-Wirtsch.-Ing. University, Fraunhofer CML (14 pages).

Federal Railroad Administration, "Comparative Evaluation of Rail and Truck Fuel Efficiency on Competitive Corridors", Final Report, Nov. 19, 2009, ICF International (156 pages).

Paul et al., "Application of CFD to Rail Car and Locomotive Aerodynamics", The Aerodynamics of Heavy Vehicles II: Trucks, Buses, and Trains. Springer, Berlin, Heidelberg, 2009, 259-297, (39 pages).

Sailing News, "America's Cup: Apparent wind", Video, 2:31, Youtube, Sep. 25, 2013, (2 pages) Website: https://www.youtube.com/watch?v=VAmUcRdqhjU&feature=youtu.be&t=44s.

Storms et al., "Fuel Savings & Aerodynamic Drag Reduction From Rail Car Covers", AfricaRail 2008; Jun. 2-6, 2008; Johannesburg; South Africa, (2 pages).

Yeung-Cheng et al., "Options for Improving the Energy Efficiency of Intermodal Freight Trains", Transportation Research Record: Journal of the Transportation Research Board, No. 1916, Transportation Research Board of the National Academies, Washington, D.C., 2005, pp. 47-55. (9 pages).

\* cited by examiner

SYSTEM AND METHOD FOR ARRANGING TRANSPORTATION SYSTEMS FOR TRAVEL

CROSS-REFERENCE TO RELATED APPLICATIONS

This application claims priority to U.S. Provisional Application No. 62/478,368, which was filed on 29 Mar. 2017, and the entire disclosure of which is incorporated herein by reference.

FIELD

The subject matter described herein relates to transportation systems.

BACKGROUND

Operators using transportation systems seek solutions to moving vehicles through the transportation systems that address fuel costs, labor shortages, labor hours-of-service constraints, and safety. Some solutions involve platooning several vehicles to travel together along routes between locations. Existing solutions for coordination of a plurality of vehicles in a platoon or train provide for incremental process performance per one or more performance criteria. The coordination of a plurality of vehicles in a platoon or train can reduce the total wind drag forces and associated parasitic energy losses of the group of vehicles (relative to the vehicles traveling alone).

But, current systems do not provide insight into other factors that can impact the decisions of which vehicles to include in a platoon, when the platoon of vehicles should travel, and/or how the platoon of vehicles should travel to increase the efficiency of the vehicles relative to traveling outside of the platoon, traveling at other times, and/or traveling in another manner (e.g., taking other routes). Thus, operators may direct a platoon of vehicles to travel to a destination location in a manner that is less efficient.

BRIEF DESCRIPTION

In one embodiment, a system includes one or more processors configured to determine wind information for achieving a desired outcome for upcoming planned travel of a selected group of one or more of plural vehicles along one or more routes. The one or more processors also are configured to determine one or more of wind drag or a parasitic energy loss for travel by different potential groups of the plural vehicles based on the wind information. The one or more processors are configured to calculate the one or more of wind drag or parasitic energy loss for each of plural, different locations along the one or more routes and to change one or more aspects of the upcoming planned travel of the selected group of the one or more of the plural vehicles based on the one or more of wind drag or parasitic energy loss that is determined.

In one embodiment, a method includes determining wind information for achieving a desired outcome for upcoming planned travel of a selected group of one or more of plural vehicles along one or more routes, determining one or more of wind drag or a parasitic energy loss for travel by different potential groups of the plural vehicles based on the wind information, calculating the one or more of wind drag or parasitic energy loss for each of plural, different locations along the one or more routes, and changing one or more aspects of the upcoming planned travel of the selected group of the one or more of the plural vehicles based on the one or more of wind drag or parasitic energy loss that is determined.

In one embodiment, a system includes one or more processors configured to determine wind speed and wind direction for plural locations along one or more routes. The one or more processors also are configured to determine one or more of wind drag or a parasitic energy loss for travel by different potential groups of one or more vehicles along the one or more routes based on the wind speed and wind direction. The one or more processors are configured to one or more of select a group of the different potential groups of one or more vehicles for travel along the one or more routes based on the one or more of wind drag or parasitic energy loss that is determined or change one or more aspects of travel of the group of one or more vehicles that is selected based on the one or more of wind drag or parasitic energy loss that is determined.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
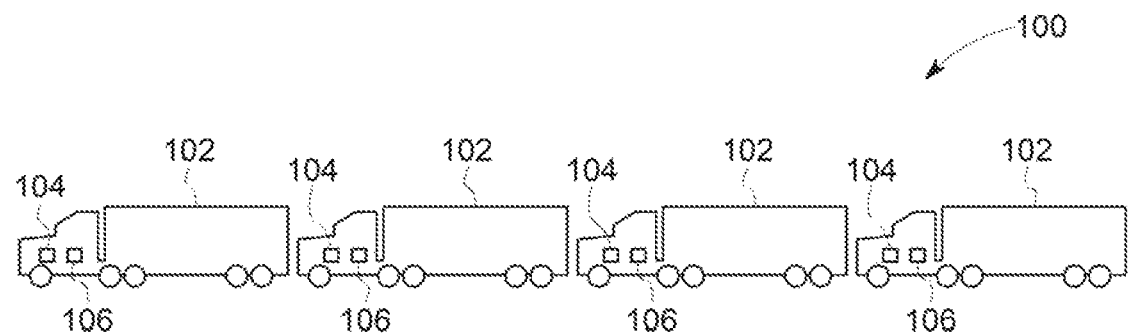
FIG. 1 illustrates one example of a group of vehicles.

One or more embodiments of the inventive subject matter described herein provide control systems and methods for controlling a transportation process having a plurality of vehicles. The systems and methods provide improved process performance per one or more performance criteria. These criteria can include energy efficiency (e.g., fuel efficiency and/or electric energy efficiency), equipment life expectancy, safety, emissions, operational costs, labor productivity, or the like. The systems and methods can provide diagnostic information and/or prognostic information for improving operation of transportation systems over a time horizon via decision support.

This diagnostic information and/or prognostic information can include information about wind drag forces exerted on one or more groups of vehicles traveling along routes in a transportation network, and associated parasitic energy losses of the group(s) of vehicles in a platoon. The vehicles can be automobiles, trucks, rail vehicles, marine vessels, aircraft, mining vehicles, other off-highway vehicles (e.g., vehicles that are not designed or are not legally permitted for travel on public roadways), or the like, traveling together in a group (also referred to as a platoon or train). The vehicles may not be mechanically coupled with each other in a platoon. For example, multiple trucks can communicate with each other during movement to coordinate the relative movements of the trucks so that the trucks travel together along the routes as a group. Optionally, the vehicles can be mechanically coupled with each other, such as in a train of rail vehicles.

The wind drag forces and other parasitic energy losses can be determined based on a variety of factors. These factors can include vehicle and/or group characteristics, and/or wind information. The vehicle and/or group characteristics can include the moving speed of the vehicle or vehicle group, the direction of movement of the vehicle or vehicle group, the geographic location of the vehicle or vehicle group, and/or the coefficient of wind drag as a function of apparent wind yaw angle. These vehicle and/or group characteristics can be previous characteristics of the vehicle or vehicle group, current characteristics of the vehicle or vehicle group, and/or upcoming (e.g., predicted or planned) characteristics of the vehicle or vehicle group. The wind information can include the ground level true wind speed and/or apparent wind speed. The true wind speed includes a wind speed measured by a stationary observer (e.g., sensor), while the apparent wind speed includes a wind speed measured by a moving observer (e.g., moving sensor). The wind information optionally can include the ground level true wind direction and/or the apparent wind direction. The wind information can be the previous, current, and/or upcoming (e.g., predicted or planned) wind speed and/or direction.

The diagnostic information and/or prognostic information about the wind drag forces and associated parasitic energy losses can be synthesized to provide decision support to improve scope and target allocation of solutions for coordination of a plurality of vehicles in a platoon or train by geographical location. Effective decision support for the dynamic geographical allocation of solutions for coordination of a plurality of vehicles in a platoon or train for improved total factor productivity is provided by the systems and methods described herein.

Examples of inputs into the systems and methods for use in determining the diagnostic information and/or prognostic information about the wind drag forces and associated parasitic energy losses can include the ground level true wind speed and direction, the locations or layouts of routes traveled by the groups of vehicles, the coefficients of drag for the vehicles or groups of vehicles as a function of apparent wind yaw angle, and/or the moving speed of the vehicles or groups of vehicles.

The wind drag forces and/or associated parasitic energy losses for previous trips, current trips, and/or upcoming (e.g., planned) trips of a variety of different combinations of vehicle groups can be determined and reported to operators or users of the systems and methods. Based on this information, the operators or users can determine which vehicles to include in a group of vehicles for a trip, how many vehicles to include in the group of vehicles for the trip, when the group of vehicles should depart or otherwise travel in the trip, and/or how the group of vehicles should travel in the group (e.g., the operational settings, routes, or the like, that the vehicles in the group should move according to or on during the trip). Optionally, the vehicles (e.g., controllers or control systems disposed onboard the vehicles) can automatically change how the vehicles operate based on the wind drag forces and/or the parasitic energy losses. For example, the controllers or control systems can automatically slow down movement of the vehicles in areas having greater headwinds to reduce wind drag and/or parasitic energy losses. As another example, the controllers or control systems can automatically speed up movement of the vehicles in areas having greater tailwinds to take advantage of the additional force provided by the winds. At least one technical effect of the inventive subject matter described herein includes the planning of a trip and/or automated control of vehicles during a trip in a more efficient manner based on the wind drag and associated parasitic energy loss (relative to not taking wind drag and parasitic energy loss into account).

FIG. 1 illustrates one example of a group 100 of vehicles 102. The group 100 of vehicles 102 optionally can be referred to as a vehicle system. The vehicles 102 are shown as trucks, but optionally can be another type of vehicle, such as automobiles, trucks, rail vehicles, marine vessels, aircraft, mining vehicles, other off-highway vehicles, or the like. The vehicles 102 can consume fuel and/or electric energy to propel the vehicles 102 (and the group 100) along one or more routes. As described above, the vehicles 102 can be mechanically separate from each other or mechanically coupled with each other to travel along one or more routes in the group 100. The group 100 optionally can be referred to as a platoon or train of the vehicles 102. Although four vehicles 102 are in the group 100 in the illustrated example, optionally, a different number of two or more vehicles 102 can be in the group 100. In one embodiment, a group 100 can include only a single vehicle 102.

The vehicles 102 can include onboard controllers 104 and communication systems 106 that communicate with each other to coordinate relative movements of the vehicles 102. The controllers 104 represent hardware circuitry that includes and/or is connected with one or more processors (e.g., one or more microprocessors, field programmable gate arrays, and/or integrated circuits) that control movement of the corresponding vehicle 102. For example, the controller 104 of a vehicle 102 can receive input from an onboard operator of the vehicle 102, from a controller 104 onboard another vehicle 102 in the same group 100, and/or from a remote control device. This input can dictate a speed, throttle setting, brake setting, steering direction (e.g., heading), or the like, for the controller 104 to implement via communication of one or more control signals to propulsion and/or braking equipment of the vehicle 102. The communication systems 106 can represent transceiving circuitry, such as modems, antennas, or the like, that communicate signals between the vehicles 102. The controllers 104 and communication systems 106 can communicate with each other to allow for the vehicles 102 to coordinate the movements of the vehicles 102 with each other to cause the group 100 of vehicles 102 to travel along the routes, such as by maintaining a separation distance between the vehicles 102 and/or not allowing the separation distance between the vehicles 102 to become too large.

Transportation system operators manage movement of cargo, people, or the like, across geographic areas by determining trips that different groups 100 of vehicles 102 are to take. These trips can be determined by configuring how many vehicles 102 to include in a group 100, which vehicles 102 to include in a group 100 (out of a larger fleet of vehicles 102), which routes the group 100 of vehicles 102 are to travel on to reach an intermediate or destination of the trip, and/or when the group 100 of vehicles 102 is to travel on the trip. A wide variety of factors can impact the decision of the operator to configure the trips of the groups 100 of vehicles 102. One embodiment of the inventive subject matter described herein provides a multi-objective optimization system and method for assisting the operators in configuring the groups 100 of vehicles 102 for the trips and/or for automatically configuring the groups 100 of the vehicles 102 for the trips. The term "optimization" and various forms thereof are not limited to the best possible, most effective, or most efficient configuration of the groups 100 of vehicles 102, but include improving the effectiveness and/or efficiency in which the vehicles 102 are moved through a transportation network of routes relative to a non-optimized system or method. This improvement can be achieved by configuring the trips of the groups 100 of vehicles 102 based on wind drag and parasitic energy losses on the potential groups 100 of vehicles 102 relative to configuring the groups 100 of vehicles 102 without consideration to the wind drag and parasitic energy losses.

Figure 2:
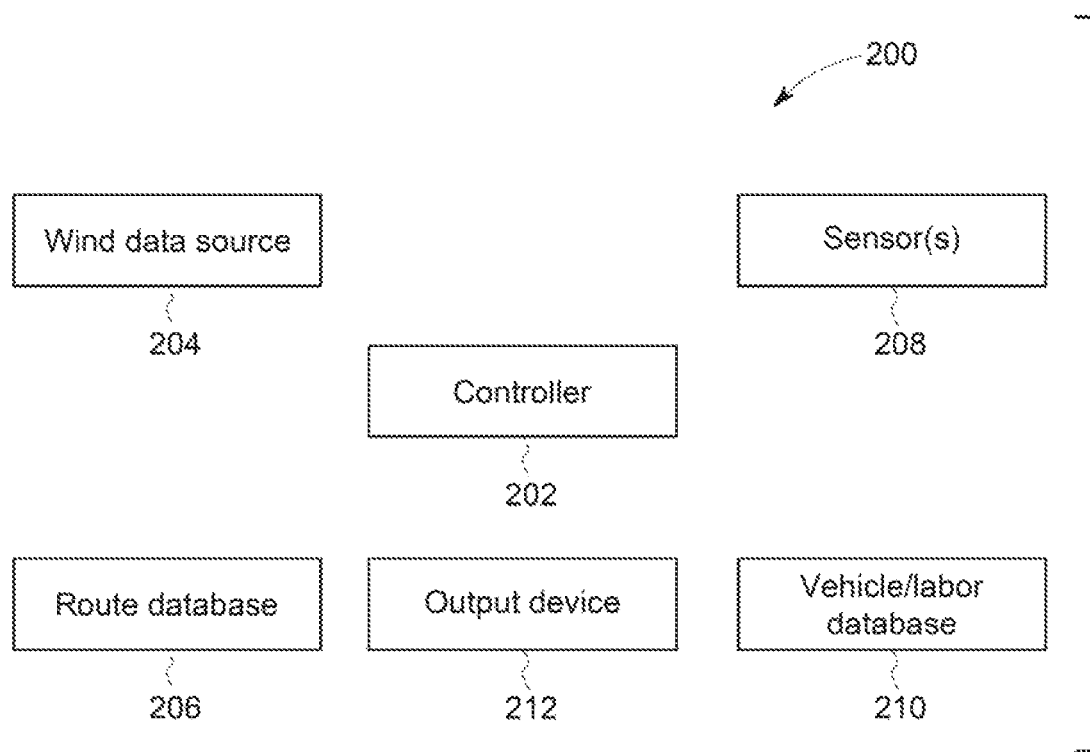
FIG. 2 illustrates one example of a multi-objective optimization system.

FIG. 2 illustrates one example of a multi-objective optimization system 200. The system 200 includes a controller 202 that obtains information from a variety of sources to determine how to configure trips and/or groups 100 of vehicles 102 (shown in FIG. 1) for the trips based on wind drag and parasitic energy loss determinations, or to assist the determination of how to configure trips and/or groups 100 of vehicles 102 (shown in FIG. 1) for the trips. The controller 202 represents hardware circuitry that includes and/or is connected with one or more processors (e.g., one or more microprocessors, field programmable gate arrays, and/or integrated circuits) that make these determinations.

One source of information obtained by or provided to the controller 202 includes wind information (also referred to as wind data). This wind information can be provided by or obtained from a wind data source 204. The wind data source 204 can be a central data repository of wind information, such as the United States National Weather Service. Optionally, the wind data source 204 can represent wind speed sensors in different locations. The wind information from the wind data source 204 can indicate the ground level true wind speed and direction at different geographic locations. Optionally, the wind data provided by the wind data source 204 can be a forecast of wind conditions. For example, the wind data source 204 can communicate predicted, estimated, or expected wind speeds and directions at various locations as the wind data.

A route database 206 can be another source of information for the controller 202. The route database 206 can represent a computer readable memory, such as one or more computer hard drives, optical drives, flash drives, or the like. The route database 206 stores information on the layout of routes over which the groups 100 of vehicles 102 can travel. This information can include geographic locations of the routes, curvatures of the routes, grades of the routes, traffic information (e.g., previous, current, or predicted amounts of traffic on the routes), or the like.

One or more sensors 208 can be another source of information for the controller 202. The sensors 208 can represent one or more measuring devices that collect and report information to the controller 202. In one embodiment, the sensors 208 can be speed sensors (e.g., tachometer) that measure and communicate moving speeds of the groups 100 of vehicles 102. These speeds can be previous, current, or planned upcoming speeds of the groups 100 of vehicles 102. In embodiments, sensor information (e.g., of vehicle speed, vehicle heading, and/or wind information as sensed onboard a vehicle) is communicated wirelessly, using radiofrequency transceivers or the like, from vehicles to an offboard location having the one or more processors as described elsewhere herein. (Such radiofrequency transceivers may be additionally used for purposes other than communicating wind information, e.g., for voice or control communications.) In embodiments, one or more vehicles respectively include one or more on-board sensors that are configured to generate signals indicative of wind information as sensed on-board the vehicle(s). The signals may be generated when the vehicles are moving, and/or signals may be generated when the vehicles are not moving. For example, a system may include modes of operation where: a vehicle is purposefully controlled to a stop in order to determine wind information while the vehicle is stopped, using an on-board sensor; and/or wind information is generated from plural sensors on-board plural vehicles when the vehicles are stopped for purposes other than generating wind information, e.g., the vehicles may be parked, or may be temporarily stopped as part of normal operation along a route, for example, while at a station, or while waiting for a route to clear.

A vehicle and/or labor database 210 ("Vehicle/Labor Database" in FIG. 2) can be another source of information for the controller 202. The database 210 can represent a computer readable memory, such as one or more computer hard drives, optical drives, flash drives, or the like. The database 210 stores information on which vehicles 102 are available for a trip from one location to another, information on which personnel are available to drive the vehicles 102 during the trip, information on how many personnel are available to drive the vehicles 102 during the trip, information the availability of other resources for driving the vehicles 102 during the trip (such as trailers for carrying cargo, the availability or unavailability of certain routes due to damage or repair, etc.

The controller 202 can determine coefficients of drag for different vehicles 102 and/or different combinations of the vehicles 102 in one or more groups 100. These drag coefficients can be determined as a function of apparent wind yaw angle. One example of a source for determining these drag coefficients includes the article A. Beagles and D. Fletcher, "The Aerodynamics Of Freight: Approaches To Save Fuel By Optimising The Utilisation Of Container Trains," Proceedings Of The Institution Of Mechanical Engineers, Part F: Journal Of Rail And Rapid Transit (2017).

The controller 202 can determine the drag forces exerted or expected to be exerted on different options of groups 100 of vehicles 102 based on the information provided to or otherwise obtained by the controller 202. For example, the controller 202 can associate different wind speeds and directions with different segments of routes based on the information from the wind data source 204 and the route database 206. The controller 202 can determine which routes could be traveled on by a group 100 of vehicles 102 to complete a trip based on information from the route database 206. For example, the controller 202 can determine available paths over the routes that could be traveled to reach a designated location (e.g., a destination location).

The controller 202 can receive or determine which vehicles 102 are available to be included in one or more groups 100. For example, a list or other structure of which vehicles 102 are available to be included in a group 100 traveling from one location to another can be input to the controller 202 or obtained by the controller 202 (e.g., from the database 210). The controller 202 can determine which vehicles 102 are available for inclusion in the group 100 from this information. For example, some vehicles 102 may be in other locations, may be in need of repair, may not be suitable for the trip, or the like, and therefore not available to be included in the group 100.

The controller 202 can determine which or how much personnel is available to operate (e.g., drive) the vehicles 102 in the group 100 during the trip. This determination can be made based on the information stored in the database 210. Some personnel may be in other locations, may not be trained or licensed to drive certain vehicles 102, or the like, and therefore unavailable for operating one or more vehicles 102 in the group 100.

Some resources for driving the vehicles 102 during the trip may be unavailable, such as refrigerated trailers for holding refrigerated cargo during the trip, trailers that are long enough to carry certain elongated cargo, etc. As another example, some roads, bridges, or tunnels may be unavailable for travel over or under during the trip due to damage to the road, bridge, or tunnel, ongoing repair or construction of the road, bridge, or tunnel, or the like.

The controller 202 determines potential groups 100 of vehicles 102 based on the availability of vehicles 102 and/or labor (e.g., available personnel) and/or based on the route information for completing a trip. The controller 202 can then examine the impact of wind drag and parasitic energy losses on the different potential groups 100 of vehicles 102. This examination can be performed by the controller 202 calculating the total wind drags exerted on each of the different potential groups 100 of vehicles 102 based on the potential routes over which the potential groups 100 may travel to reach a destination location, the wind speeds and directions, and the speeds at which the groups 100 of vehicles 102 may move. The wind speeds and directions can be previous, current, or predicted wind speeds and directions. The predicted wind speeds and directions can be based on previous and/or current wind speeds and directions, such as the wind speeds and directions that occurred on the same date, during the same season, or the like, in the same locations. Optionally, the predicted wind speeds and directions can be based on forecasted wind information. The moving speeds of the groups 100 of vehicles 102 can be the speed limits of the routes, can be a designated speed (e.g., twenty meters per second), or can be based on previous trips (such as the speeds of groups 100 traveling the same routes and/or having the same number of vehicles 102 during previous trips).

The parasitic energy losses of the different groups 100 of vehicles 102 represents how much energy (e.g., fuel, electric energy, etc.) is or will be consumed by wind drag during movement of the different groups 100 of vehicles 102. During movement of a vehicle 102 or group 100 of vehicles 102, fuel and/or electric energy is consumed to generate kinetic energy to the group 100 of vehicles 102. The fuel can be used to generate mechanical energy, electric energy, and tractive energy. Some of the generated energy is lost to various parasitic losses, such as thermal losses, grade resistance, curve resistance, rolling resistance, and the like. One parasitic loss of this energy is wind drag. The controller 202 can calculate or estimate the amount of wind drag or the amount of energy lost to wind drag for the different potential groups 100 of vehicles 102 (e.g., based on physical modeling calculations using the wind information described herein). The wind drag and/or parasitic losses can then be used to determine which vehicles 102 are to be included in a group 100 of vehicles 102 for a trip.

In one embodiment, the controller 202 visually presents the wind drag and/or parasitic losses to an operator of the system 200 via an output device 212. The output device 212 can represent a display device. The controller 202 can visually present this information to allow the operator to use this information for deciding which vehicles 102 to include in the group 100 and/or which route(s) should be traveled by the vehicles 102 for traveling from one location to another in the trip. This presentation can include a list or set of options for which vehicles 102 can be included in the group 100 and/or the routes that can be traveled over for the trip, along with associated wind drags and/or parasitic energy losses. The list or set can be ranked or otherwise provided in an order reflective of the wind drags and/or parasitic losses, such as a list of the vehicles 102 (or number of vehicles 102) to include in the group 100 and/or routes to travel over for the trip in an order from the lowest wind drag and/or parasitic energy loss to the greatest wind drag and/or parasitic energy loss. The operator can then select the group 100 of vehicles 102 and/or routes based on this presentation. Optionally, the controller 202 can automatically select which vehicles 102 are to be included in the group 100 (as described below) without operator input. In one embodiment, the controller 202 can automatically adjust existing route plans for the trip based on the operator selection, wind drag, and/or parasitic energy loss that is determined. For example, the trip for the group 100 may be scheduled to travel over a set of routes. The controller 202 can automatically change which routes are included in the set for the trip in order to reduce the wind drag and/or parasitic energy loss expected to be experienced during the trip.

In one embodiment, the controller 202 can communicate the wind drag and/or parasitic losses to one or more of the vehicle controllers 104. The vehicle controller 104 can use this information to automatically change movement of the vehicles 102 based on the wind drags and/or parasitic energy losses. For example, a vehicle controller 104 can examine the wind drag and/or parasitic energy loss associated with a stretch of road or track and can automatically slow down movement of the vehicle 102 (responsive to the wind drag indicating a strong headwind against the direction of travel of the vehicle 102) or can automatically speed up movement of the vehicle 102 (responsive to the wind drag indicating a strong tailwind in the direction of travel of the vehicle 102). Optionally, the controller 104 can change which route a vehicle 102 is traveling on based on the wind drag and/or parasitic energy losses. For example, in a self-driving automobile or truck, the controller 104 can determine that another road is associated with less wind drag and less parasitic energy loss than a current or planned road for travel on. The controller 104 can change which road the automobile or truck 102 travels on to avoid the higher wind drag road.

Figure 3:
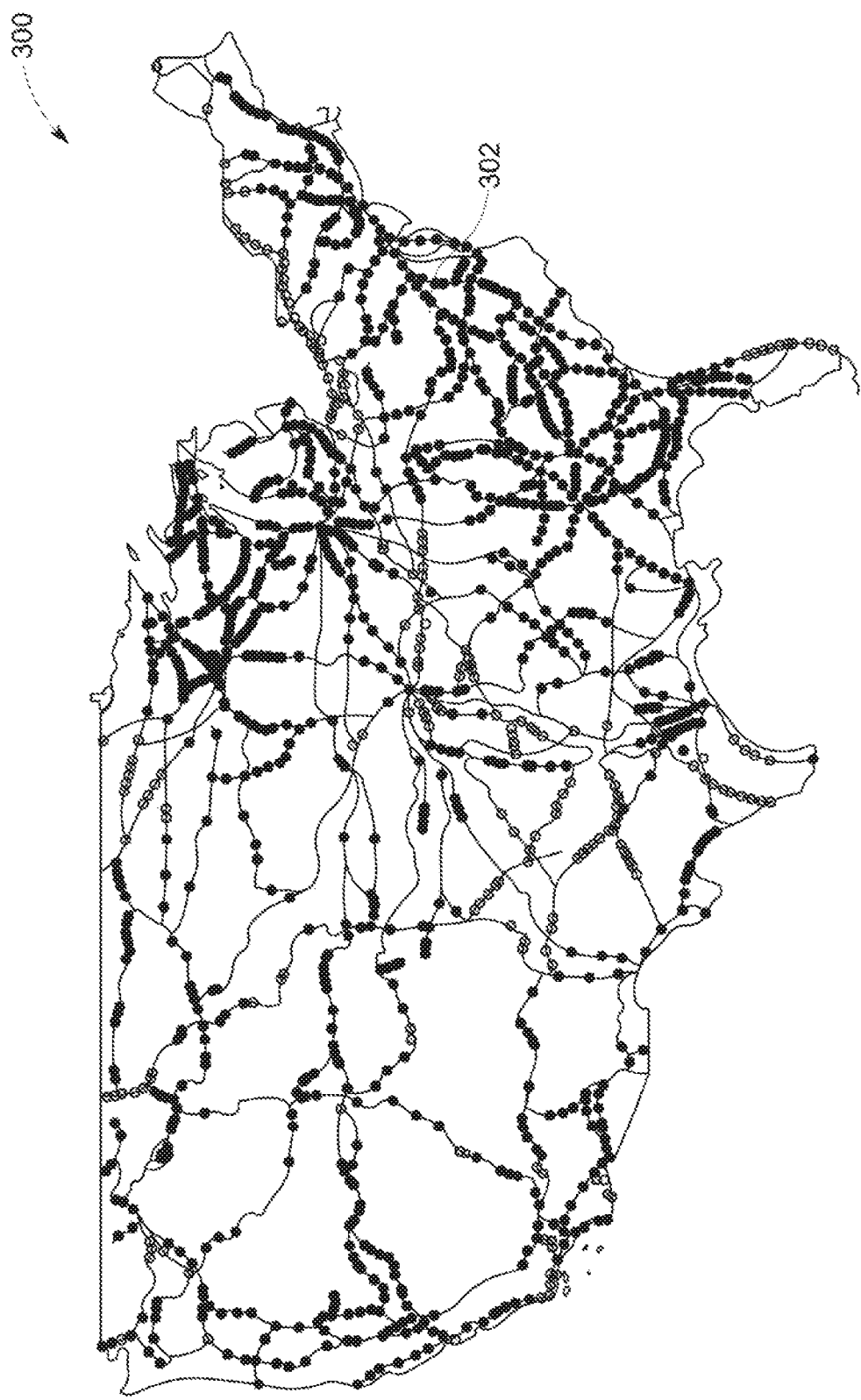
FIG. 3 illustrates one example of a visual presentation of wind drags and/or parasitic losses determined by the system shown in FIG. 2.
Figure 4:
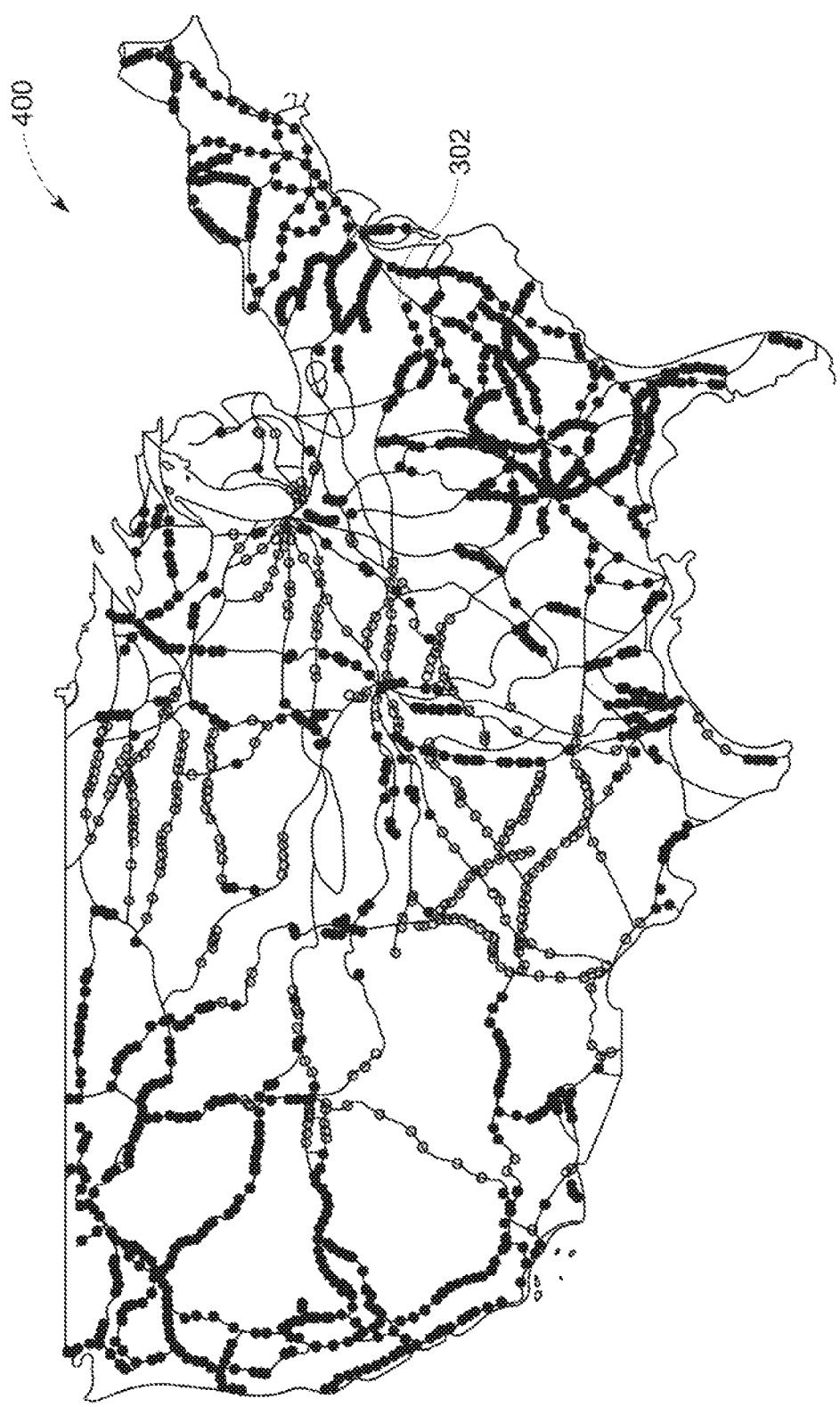
FIG. 4 illustrates another example of a visual presentation of wind drags and/or parasitic losses determined by the system shown in FIG. 2.
Figure 5:
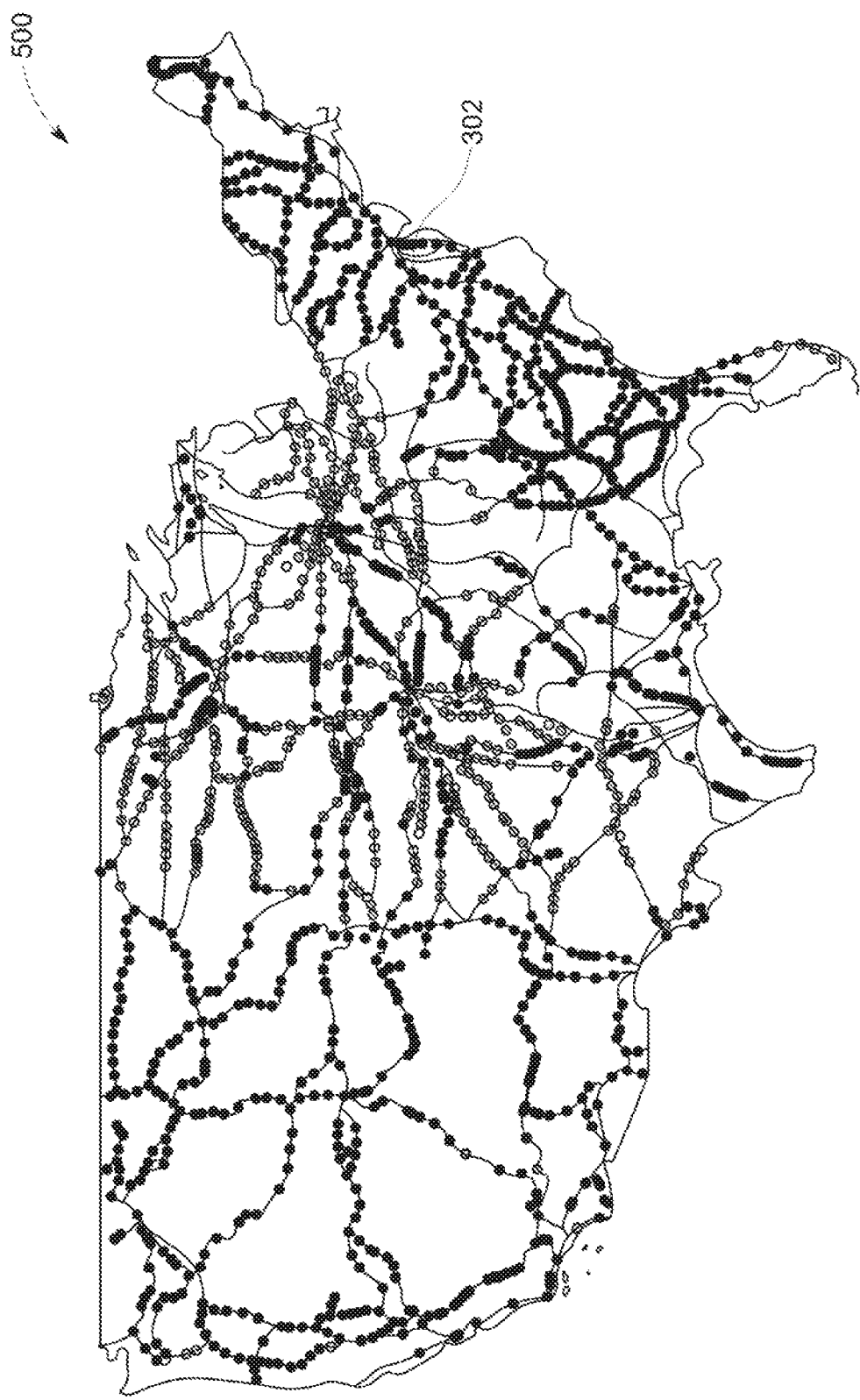
FIG. 5 illustrates another example of a visual presentation of wind drags and/or parasitic losses determined by the system shown in FIG. 2.

FIGS. 3 through 5 illustrate different examples of visual presentations 300, 400, 500 of wind drags and/or parasitic losses determined by the controller 202 (shown in FIG. 2). The visual presentations 300, 400, 500 are maps of routes 302 forming at least part of a transportation network. The routes 302 can be presented using different colors, lines, or the like, to represent different wind drags and/or parasitic energy losses for the potential group 100 of vehicles 102 (shown in FIG. 1). For example, for a first potential group 100 of vehicles 102, the controller 202 can generate the map 300 to indicate the wind drags and/or parasitic energy losses expected to be experienced by the first potential group 100 of vehicles 102 during travel on the various routes 302. The different colors, lines, etc., of the routes 302 in the map 300 can indicate greater or lesser wind drags and/or parasitic energy losses. The controller 202 can generate the map 400 for a different, second potential group 100 of vehicles 102 to indicate the wind drags and/or parasitic energy losses expected to be experienced by the second potential group 100 of vehicles 102 during travel on the various routes 302. The maps 300, 400, 500 can be referred to as heat maps, with different levels of "heat" indicated by different colors that represent different amounts of wind drag and/or parasitic energy losses.

An operator of the system 200 can examine the maps 300, 400, 500 to determine which group 100 of vehicles 102 to use for a trip. For example, if review of the maps 300, 400, 500 indicates that the first potential group 100 of vehicles 102 associated with the map 300 would experience less wind drag and/or lose less energy to parasitic energy losses than the second and third potential groups 100 of vehicles 102 (as represented by the corresponding maps 400, 500), then the operator can select the first potential group 100 of vehicles 102 for the trip. The vehicles 102 forming the first potential group 100 can then be arranged together for actual travel in the trip.

Optionally, the controller 202 can make the determination of which group 100 of vehicles 102 should travel for the trip. The controller 202 can examine the wind drags and/or parasitic energy losses calculated for the trip for the different potential groups 100 of vehicles 102. The controller 202 can then select a group 100 from these potential groups 100 based on the wind drags and/or parasitic energy losses. For example, the controller 202 can select the group 100 having the smallest wind drag and/or parasitic energy losses from the potential groups 100. The controller 202 can then communicate a signal to the output device 212 (shown in FIG. 2) to notify the operator of the system 200 of which vehicles 102 to include in the group 100. Optionally, the controller 202 can communicate a signal to the controllers 104 (shown in FIG. 1) of one or more of the vehicles 102 to cause the controllers 104 to automatically move the vehicles 102 into position for forming the selected group 100. Optionally, the controller 202 can automatically change the trip to reduce the wind drag and/or parasitic energy loss. For example, the controller 202 can change which routes are being traveled over, the speeds at which the group 100 of vehicles 102 will travel, and/or when the group 100 of vehicles 102 travels to reduce the wind drag and/or parasitic energy loss.

Figure 6:
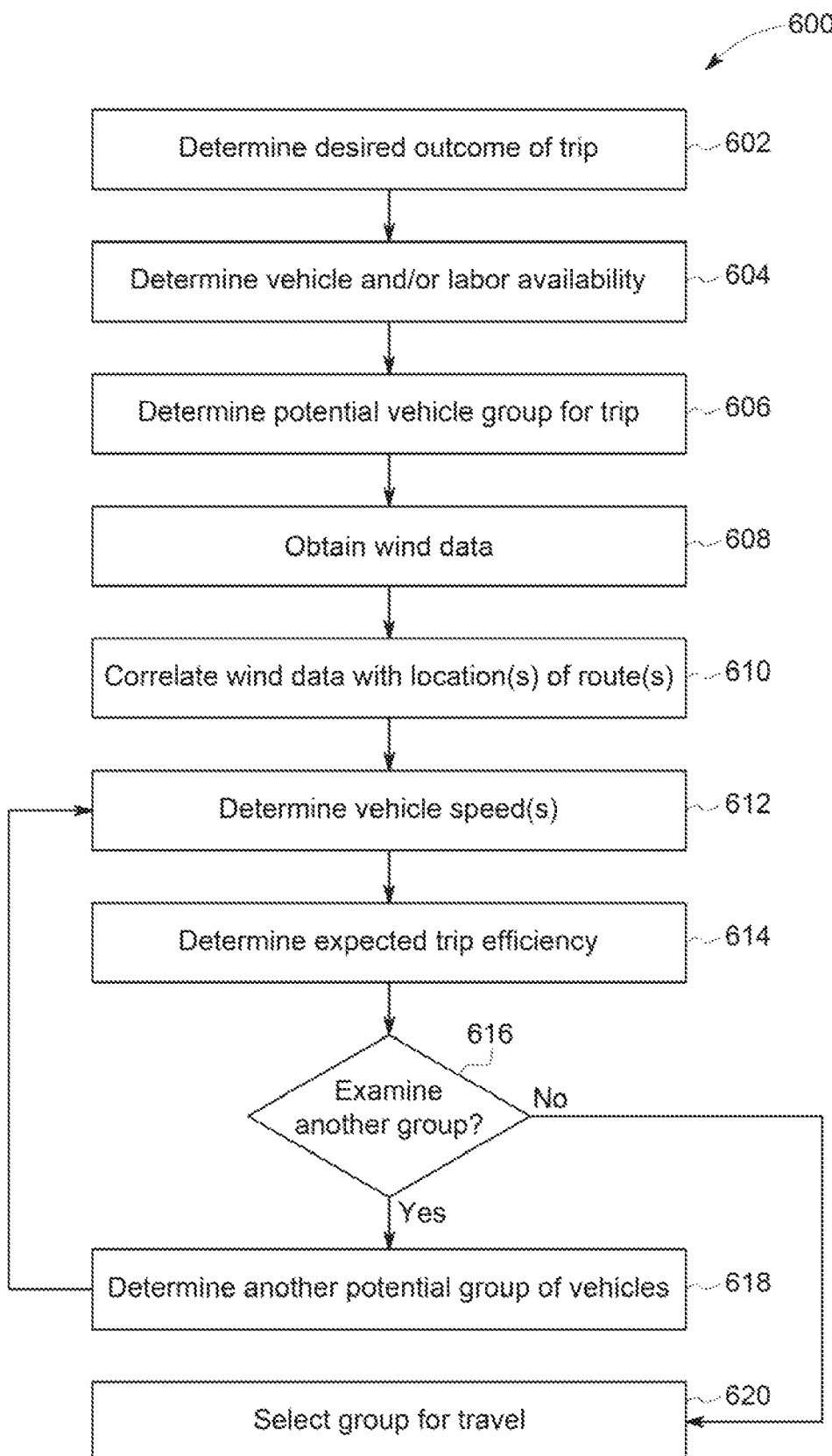
FIG. 6 illustrates a flowchart of a method for optimizing objectives in a transportation system.

FIG. 6 illustrates a flowchart of a method 600 for optimizing objectives in a transportation system. The flowchart of the method 600 can represent operations performed by the system 200 described above under the direction of software. Optionally, the software can be created or written based on an algorithm represented by the flowchart of the method 600.

At 602, a desired outcome for a group of vehicles is determined. The desired outcome can be a goal or result of a trip of the group of vehicles. Examples of desired outcomes can include moving a designated amount of cargo from a starting location to a destination location (e.g., moving a number of intermodal containers from Chicago to Los Angeles), moving an unknown or changing amount of cargo to a location within a scheduled time period (e.g., moving passengers between locations on a fixed schedule), or the like.

At 604, vehicle availability and/or labor availability are determined. The vehicle availability includes a determination of which vehicles are available to be included in the group for the trip. Some vehicles may be unavailable due to the vehicles being too far away to be included in the group for the trip, due to the vehicles being under repair or scheduled for repair, due to the vehicles not being capable of transporting the cargo for the trip, etc. Some vehicles may not be suitable for the desired outcome of the trip. For example, some vehicles may be incapable of transporting the type of cargo needed to be moved, some vehicles may be incapable of traveling at speeds needed to arrive within a scheduled time period, some vehicles may be incapable of traveling to the destination location (e.g., due to (a) the vehicles being too wide or tall and (b) the routes being too narrow or overhead clearances being too low), or the like. The labor availability includes a determination of which personnel are available to operate the vehicles in the group for the trip. Some personnel may be unavailable due to the personnel being too far away to be included in a vehicle of the group for the trip, due to the personnel not being trained or licensed to operate a vehicle in the group, etc.

At 606, one or more potential groups of vehicles for the trip are determined. A potential group can include a set of one or more vehicles for inclusion in the group for the trip. Optionally, a group can include at least two vehicles. The vehicles selected for inclusion in a potential group can be based on the vehicle availability and/or labor availability determined above.

At 608, wind data are obtained. The wind data can include information on wind speed and/or direction. The wind data that are obtained can the wind speed and/or direction at or near (e.g., within a designated distance threshold, such as five kilometers) locations of the trip and/or routes between the locations of the trip.

At 610, the wind data are correlated with location(s) of one or more routes of the trip. For example, different potential routes for a trip between a starting location and an end location can be determined. The wind data associated with locations at or near these routes can be associated with the different locations along the routes.

At 612, vehicle speeds are determined. These speeds can include actual and/or planned vehicle speeds. For example, the speeds at which a group of vehicles previously traveled on the routes of the trip, the speed limits of the routes of the trip, and/or designated speeds of the vehicles for an upcoming scheduled trip can be determined. The planned speeds can include the speeds at which the vehicles plan to travel along the routes, such as speeds designated by a trip plan of the trip. Optionally, the speeds can be speed limits of the routes. The trip plan can be created to dictate operational settings (e.g., speeds, throttle settings, and/or brake settings) for the vehicles at different locations, different times, and/or different distances along the routes for the trip.

At 614, an expected trip efficiency for the potential group of vehicles to travel in the trip is determined. The trip efficiency can be determined as an amount of wind drag and/or parasitic energy losses that the potential group of vehicles may experience. As described above, the wind drag and/or parasitic energy losses can be determined based on the vehicle speeds, wind speeds, and wind directions. Greater wind drags and/or parasitic energy losses indicate lower trip efficiencies, while smaller wind drags and/or parasitic energy losses indicate larger trip efficiencies. In one embodiment, a map or heat map indicating the various wind drags and/or parasitic energy losses that the vehicle system will encounter on different routes during the trip can be determined.

At 616, a determination is made as to whether the expected trip efficiency is to be determined and/or examined for another, different group of vehicles. For example, a decision can be made as to whether there is another, different group of vehicles that can travel in the trip. If there is another potential group of vehicles to be examined, then flow of the method 600 can proceed toward 618 for determination of another group of vehicles. But, if there is not another potential group of vehicles to be examined, then flow of the method 600 can proceed toward 620.

At 618, another potential group of vehicles is determined. For example, the number of vehicles in a potential group can be changed from the previously examined potential group, the locations of the vehicles in the previously examined potential group can be changed, and/or the vehicles in the potential group can be changed from the previously examined potential group. Flow of the method 600 can return toward 612 so that the efficiency of this other, different potential group can be examined. For example, the wind drags and/or parasitic energy losses for this different potential group can be determined. The method 600 can continue in a loop to examine the efficiencies for multiple, different potential groups of vehicles.

Optionally, at 618, a determination can be made as to whether one or more aspects of the trip can be changed to reduce the wind drag and/or parasitic energy loss for the group of vehicles being examined. The details of the trip can include the speeds at which the vehicle(s) in the group will travel, the routes over which the vehicle(s) in the group will travel, the times at which the vehicle(s) in the group will travel, and the like. One or more of these details can be changed or otherwise adjusted to change the trip and potentially reduce the wind drag and/or parasitic energy loss. For example, traveling at a different time and/or date may result in the vehicle(s) traveling in reduced wind speed and/or traveling in a tailwind as opposed to a headwind.

At 620, a potential group is selected for traveling in the trip. This selection can be performed by choosing the group of vehicles having the lowest wind drag and/or parasitic energy losses of the examined potential groups (or lower than one or more other potential groups). Responsive to selecting a potential group for the trip, the vehicles in the group can be moved to the same area and the trip can begin.

In one embodiment, a system includes one or more processors configured to determine wind information for achieving a desired outcome for travel of a selected group of one or more vehicles along one or more routes. The one or more processors also are configured to determine one or more of wind drag or a parasitic energy loss for travel by different potential groups of vehicles based on the wind information. The one or more processors are configured to one or more of determine the one or more of wind drag or parasitic energy loss for each of plural, different locations along the one or more routes, visually present the one or more of wind drag or parasitic energy loss for each of the different groups of vehicles, and/or determine the selected group of the one or more vehicles from the different groups of vehicles for travel along the one or more routes to achieve the desired outcome based on the one or more of wind drag or parasitic energy loss that is determined.

In one example, the one or more processors are configured to change one or more aspects of the travel of the selected group of the one or more vehicles based on the one or more of wind drag or parasitic energy loss that is determined.

In one example, the one or more processors are configured to change (e.g., modify) one or more designated speeds at which the one or more vehicles in the selected group are to travel based on the one or more of wind drag or parasitic energy loss that is determined as the one or more aspects of the travel of the selected group.

In one example, the one or more processors are configured to change at least one route of the one or more routes on which the one or more vehicles in the selected group are to travel based on the one or more of wind drag or parasitic energy loss that is determined as the one or more aspects of the travel of the selected group.

In one example, the one or more processors are configured to change a time at which the one or more vehicles in the selected group are to travel based on the one or more of wind drag or parasitic energy loss that is determined as the one or more aspects of the travel of the selected group.

In one example, the one or more processors are configured to change the one or more aspects of the travel of the selected group by changing one or more of a designated speed at which the one or more vehicles in the selected group are to travel, at least one route of the one or more routes on which the one or more vehicles in the selected group are to travel, and/or a time at which the one or more vehicles in the selected group are to travel.

In one example, the one or more processors are configured to visually present the one or more of wind drag or parasitic energy loss for each of the different groups of vehicles as a heat map that associates different amounts of the one or more of wind drag or parasitic energy loss for the different groups of vehicles with different locations along the one or more routes.

In one example, the one or more processors are configured to determine wind speed as the wind information.

In one example, the one or more processors are configured to determine a direction of wind speed as the wind information.

In one example, the one or more processors are configured to determine a wind speed and a direction of the wind speed as the wind information.

In one example, the one or more processors are configured to determine wind speeds for plural different locations along the one or more routes as the wind information.

In one example, the one or more processors are configured to determine a direction of wind speed for plural different locations along the one or more routes as the wind information.

In one example, the one or more processors are configured to determine wind speeds and directions of the wind speeds for plural different locations along the one or more routes as the wind information.

In one example, the one or more processors also are configured to determine vehicle speed and to determine the one or more of wind drag or parasitic energy loss based on both the wind information and the vehicle speed that is determined.

In one example, the one or more processors are configured to determine a coefficient of drag as a function of apparent wind yaw angle and to determine the one or more of wind drag or parasitic energy loss based on both the wind information and the coefficient of drag that is determined.

In one example, the different groups represent one or more of different numbers of vehicles in the different groups, different vehicles in the different groups, or different arrangements of the vehicles in the different groups.

In one example, the one or more processors also are configured to determine the different groups of vehicles based on vehicle availability.

In one example, the one or more processors also are configured to determine the different groups of vehicles based on labor availability of operators to control movement of the vehicles.

In one example, the one or more processors also are configured to generate one or more control signals for controlling the selected group of vehicles, for movement during travel along the one or more routes in a trip, based on the one or more aspects of the upcoming planned travel that are changed (i.e., based on the determined wind drag and/or the determined parasitic energy loss).

In one embodiment, a method includes determining wind information for achieving a desired outcome for travel of a selected group of one or more vehicles along one or more routes, determining one or more of wind drag or a parasitic energy loss for travel by different potential groups of vehicles based on the wind information, and one or more of determining the one or more of wind drag or parasitic energy loss for each of plural, different locations along the one or more routes, visually presenting the one or more of wind drag or parasitic energy loss for each of the different groups of vehicles, and/or determining the selected group of the one or more vehicles from the different groups of vehicles for travel along the one or more routes to achieve the desired outcome based on the one or more of wind drag or parasitic energy loss that is determined.

In one example, the method also includes changing one or more aspects of the travel of the selected group of the one or more vehicles based on the one or more of wind drag or parasitic energy loss that is determined.

In one example, one or more designated speeds at which the one or more vehicles in the selected group are to travel is changed based on the one or more of wind drag or parasitic energy loss that is determined as the one or more aspects of the travel of the selected group.

In one example, at least one route of the one or more routes on which the one or more vehicles in the selected group are to travel is changed based on the one or more of wind drag or parasitic energy loss that is determined as the one or more aspects of the travel of the selected group.

In one example, a time at which the one or more vehicles in the selected group are to travel is changed based on the one or more of wind drag or parasitic energy loss that is determined as the one or more aspects of the travel of the selected group.

In one example, the one or more aspects of the travel of the selected group are changed by changing one or more of a designated speed at which the one or more vehicles in the selected group are to travel, at least one route of the one or more routes on which the one or more vehicles in the selected group are to travel, and/or a time at which the one or more vehicles in the selected group are to travel.

In one example, visually presenting the one or more of wind drag or parasitic energy loss for each of the different groups of vehicles includes generating a heat map that associates different amounts of the one or more of wind drag or parasitic energy loss for the different groups of vehicles with different locations along the one or more routes.

In one example, wind speed is determined as the wind information.

In one example, a direction of wind speed is determined as the wind information.

In one example, a wind speed and a direction of the wind speed are determined as the wind information.

In one example, wind speeds are determined for plural different locations along the one or more routes as the wind information.

In one example, a direction of wind speed is determined for plural different locations along the one or more routes as the wind information.

In one example, wind speeds and directions of the wind speeds are determined for plural different locations along the one or more routes as the wind information.

In one example, the method also includes determining a vehicle speed of the one or more vehicles in the selected group, and determining the one or more of wind drag or parasitic energy loss based on both the wind information and the vehicle speed that is determined.

In one example, the method also includes determining a coefficient of drag as a function of apparent wind yaw angle, and determining the one or more of wind drag or parasitic energy loss based on both the wind information and the coefficient of drag that is determined.

In one example, the different groups represent one or more of different numbers of vehicles in the different groups, different vehicles in the different groups, and/or different arrangements of the vehicles in the different groups.

In one example, the different groups of vehicles are determined based on vehicle availability.

In one example, the different groups of vehicles are determined based on labor availability of operators to control movement of the vehicles.

In one embodiment, a system includes one or more processors configured to determine wind speed and wind direction for plural locations along one or more routes. The one or more processors also are configured to determine one or more of wind drag or a parasitic energy loss for travel by different potential groups of one or more vehicles along the one or more routes based on the wind information. The one or more processors also are configured to one or more of visually present the one or more of wind drag or parasitic energy loss for each of the different groups of one or more vehicles, select a group of the different groups of one or more vehicles for travel along the one or more routes based on the one or more of wind drag or parasitic energy loss that is determined, and/or change one or more aspects of travel of the group of one or more vehicles that is selected.

In one example, the one or more aspects of travel that is changed includes one or more of a speed at which the one or more vehicles in the group that is selected travel along the one or more routes, a route on which the one or more vehicles in the group that is selected travel along, and/or a time at which the one or more vehicles in the group travel.

In one example, the one or more processors are configured to visually present the one or more of wind drag or parasitic energy loss for each of the different groups of vehicles as a heat map that associates different amounts of the one or more of wind drag or parasitic energy loss with the locations along the one or more routes.

In one example, the one or more processors also are configured to determine vehicle speed and to determine the one or more of wind drag or parasitic energy loss based on both the wind information and the vehicle speed that is determined.

In one example, the one or more processors are configured to determine a coefficient of drag as a function of apparent wind yaw angle and to determine the one or more of wind drag or parasitic energy loss based on both the wind information and the vehicle speed that is determined.

In one example, the different groups represent one or more of different numbers of vehicles in the different groups, different vehicles in the different groups, or different arrangements of the vehicles in the different groups.

In one example, the one or more processors also are configured to determine the different groups of vehicles based on vehicle availability.

In one example, the one or more processors also are configured to determine the different groups of vehicles based on labor availability of operators to control movement of the vehicles.

In one embodiment, a method includes receiving or otherwise determining wind information for an upcoming trip along one or more routes with one or more processors, determining one or more of respective wind drags or respective parasitic energy losses for travel by different groups of vehicles in the upcoming trip based on the wind information with the one or more processors (where each of the groups of vehicles has at least two respective vehicles), and one or more of visually presenting the one or more of wind drags or parasitic energy losses for the different groups of vehicles, or automatically selecting a group of the different groups of vehicles for travel along the one or more routes in the trip based on the one or more of wind drags or parasitic energy losses that are determined with the one or more processors.

In one example, the method also includes receiving a user-selected group of the different groups of vehicles for travel along the one or more routes in the trip with the one or more processors responsive to the one or more of wind drags or parasitic energy losses for the different groups of vehicles that are visually presented and automatically generating one or more control signals for controlling the vehicles of the user-selected group for travel along the one or more routes in the trip with the one or more processors.

In one example, the method also includes automatically generating one or more control signals with the one or more processors for controlling the vehicles of the group of the different groups of vehicles that was automatically selected, for travel along the one or more routes in the trip.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
    one or more processors configured to determine wind information for achieving a desired outcome for upcoming planned travel of a selected group of one or more of plural vehicles along one or more routes, the one or more processors also configured to determine one or more of wind drag or a parasitic energy loss for travel by different potential groups of the plural vehicles based on the wind information,
    wherein the one or more processors are configured to calculate the one or more of wind drag or parasitic energy loss for each of plural, different locations along the one or more routes and to change one or more aspects of the upcoming planned travel of the selected group of the one or more of the plural vehicles based on the one or more of wind drag or parasitic energy loss that is determined, the one or more processors also configured to change movement of the selected group of the one or more of the plural vehicles based on the one or more of the wind drag or parasitic energy loss that is determined while the selected group of the one or more of the plural vehicles moves along the one or more routes.

2. The system of claim 1, wherein to change the one or more aspects of the upcoming planned travel, the one or more processors are configured to one or more of:
    modify one or more designated speeds at which the one or more vehicles in the selected group are planned to travel based on the one or more of wind drag or parasitic energy loss that is determined as the one or more aspects of the travel of the selected group,
    change at least one route of the one or more routes on which the one or more vehicles in the selected group are scheduled to travel on based on the one or more of wind drag or parasitic energy loss that is determined as the one or more aspects of the travel of the selected group, or
    change a time at which the one or more vehicles in the selected group are scheduled to travel based on the one or more of wind drag or parasitic energy loss that is determined as the one or more aspects of the travel of the selected group.

3. The system of claim 1, wherein the one or more processors are configured to visually present the one or more of wind drag or parasitic energy loss for each of the different potential groups of vehicles as a heat map that associates different amounts of the one or more of wind drag or parasitic energy loss for the different potential groups of vehicles with different locations along the one or more routes.

4. The system of claim 1, wherein the one or more processors are configured to determine one or more of wind speed or a wind direction as the wind information.

5. The system of claim 1, wherein the one or more processors also are configured to determine vehicle speed and to determine the one or more of wind drag or parasitic energy loss based on both the wind information and the vehicle speed that is determined.

6. The system of claim 1, wherein the one or more processors are configured to determine a coefficient of drag as a function of apparent wind yaw angle and to calculate the one or more of wind drag or parasitic energy loss based on both the wind information and the coefficient of drag that is determined.

7. The system of claim 1, wherein the different potential groups represent one or more of different numbers of vehicles in the different groups, different vehicles in the different groups, or different arrangements of the vehicles in the different groups.

8. The system of claim 1, wherein the one or more processors also are configured to determine the different potential groups of vehicles based on one or more of vehicle availability or labor availability of operators to control movement of the vehicles.

9. The system of claim 1, wherein the one or more processors are configured to change one or more of (a) a speed of the selected group of the one or more of the plural vehicles or (b) which of the one or more routes that the selected group of the one or more of the plural vehicles moves along based on the one or more of the wind drag or parasitic energy loss that is determined while the selected group of the one or more of the plural vehicles is moving.

10. A method comprising:
determining wind information for achieving a desired outcome for upcoming planned travel of a selected group of one or more of plural vehicles along one or more routes;
determining one or more of wind drag or a parasitic energy loss for travel by different potential groups of the plural vehicles based on the wind information;
calculating the one or more of wind drag or parasitic energy loss for each of plural, different locations along the one or more routes;
changing one or more aspects of the upcoming planned travel of the selected group of the one or more of the plural vehicles based on the one or more of wind drag or parasitic energy loss that is determined; and
changing movement of the selected group of the one or more of the plural vehicles based on the one or more of the wind drag or parasitic energy loss that is determined while the selected group of the one or more of the plural vehicles moves along the one or more routes.

11. The method of claim 10, wherein the one or more aspects of the upcoming planned travel that are changed includes one or more of:
one or more designated speeds at which the one or more vehicles in the selected group are planned to travel,
changing at least one route of the one or more routes on which the one or more vehicles in the selected group are scheduled to travel, or
changing a time at which the one or more vehicles in the selected group are scheduled to travel.

12. The method of claim 10, further comprising visually presenting the one or more of wind drag or parasitic energy loss for each of the different potential groups of vehicles as a heat map that associates different amounts of the one or more of wind drag or parasitic energy loss for the different potential groups of vehicles with different locations along the one or more routes.

13. The method of claim 10, wherein the wind information that is determined includes one or more of wind speed or a wind direction.

14. The method of claim 10, further comprising determining a vehicle speed, wherein the one or more of wind drag or parasitic energy loss is determined based on both the wind information and the vehicle speed that is determined.

15. The method of claim 10, further comprising calculating a coefficient of drag as a function of apparent wind yaw angle, wherein the one or more of wind drag or parasitic energy loss is calculated based on both the wind information and the coefficient of drag that is determined.

16. The method of claim 10, wherein changing the movement of the selected group of the one or more of the plural vehicles includes changing one or more of (a) a speed of the selected group of the one or more of the plural vehicles or (b) which of the one or more routes that the selected group of the one or more of the plural vehicles moves along based on the one or more of the wind drag or parasitic energy loss that is determined while the selected group of the one or more of the plural vehicles is moving.

17. A system comprising:
one or more processors configured to determine wind speed and wind direction for plural locations along one or more routes, the one or more processors also configured to determine one or more of wind drag or a parasitic energy loss for travel by different potential groups of one or more vehicles along the one or more routes based on the wind speed and wind direction,
wherein the one or more processors are configured to one or more of select a group of the different potential groups of one or more vehicles for travel along the one or more routes based on the one or more of wind drag or parasitic energy loss that is determined or change one or more aspects of travel of the group of one or more vehicles that is selected based on the one or more of wind drag or parasitic energy loss that is determined, the one or more processors also configured to change movement of the group of the one or more vehicles based on the one or more of the wind drag or parasitic energy loss that is determined while the group of the one or more vehicles moves along the one or more routes.

18. The system of claim 17, wherein the one or more processors are configured to change the one or more aspects of travel by modifying one or more of a planned speed at which the one or more vehicles in the group that is selected travel along the one or more routes, a planned route on which the one or more vehicles in the group that is selected travel along, or a planned time at which the one or more vehicles in the group that is selected travel.

19. The system of claim 17, wherein the one or more processors are configured to determine a coefficient of drag as a function of apparent wind yaw angle and to determine the one or more of wind drag or parasitic energy loss based on the wind speed, the wind direction, and the coefficient of drag that is determined.

20. The system of claim 17, wherein the different potential groups represent one or more of different numbers of vehicles in the different groups, different vehicles in the different groups, or different arrangements of the vehicles in the different groups.

21. The system of claim 17, wherein the one or more processors also are configured to determine the different potential groups of vehicles based on vehicle availability.

22. The system of claim 17, wherein the one or more processors also are configured to determine the different potential groups of vehicles based on labor availability of operators to control movement of the vehicles.

23. The system of claim 17, wherein the one or more processors are configured to change the movement of the group of the one or more vehicles by changing one or more of (a) a speed of the group of the one or more vehicles or (b) which of the one or more routes that the group of the one or more vehicles moves along based on the one or more of the wind drag or parasitic energy loss that is determined while the group of the one or more vehicles is moving.

\* \* \* \* \*